(12) United States Patent
Li et al.

(10) Patent No.: US 9,762,374 B1
(45) Date of Patent: Sep. 12, 2017

(54) POWER LINE COMMUNICATION BASED MONITORING SYSTEM

(71) Applicant: HONEYWELL INTERNATIONAL INC., Morris Plains, NJ (US)

(72) Inventors: Qixiang Li, Beijing (CN); Dinkar Mylaraswamy, Fridley, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/093,099

(22) Filed: Apr. 7, 2016

(51) Int. Cl.
*H04L 5/14* (2006.01)
*H04B 3/54* (2006.01)
*H02J 3/00* (2006.01)

(52) U.S. Cl.
CPC .......... *H04L 5/14* (2013.01); *H02J 3/00* (2013.01); *H04B 3/54* (2013.01)

(58) Field of Classification Search
CPC ...................................... H04L 5/14; H04B 3/54
USPC .......................................................... 375/222
See application file for complete search history.

(56) References Cited

U.S. PATENT DOCUMENTS

| | | |
|---|---|---|
| 5,006,846 A | 4/1991 | Granville et al. |
| 5,210,519 A | 5/1993 | Moore |
| 6,181,990 B1 | 1/2001 | Grabowsky et al. |
| 6,222,443 B1 * | 4/2001 | Beeson ................. B60D 1/065 307/10.1 |
| 6,839,597 B2 | 1/2005 | Hattori et al. |
| 6,917,888 B2 | 7/2005 | Logvinov et al. |
| 6,934,862 B2 | 8/2005 | Sharood et al. |
| 6,995,658 B2 | 2/2006 | Tustison et al. |
| 7,076,378 B1 | 7/2006 | Huebner |
| 7,131,136 B2 | 10/2006 | Monroe |
| 7,554,320 B2 | 6/2009 | Kagan |
| 7,558,206 B2 | 7/2009 | Berkman et al. |
| 7,660,345 B2 | 2/2010 | Yu |
| 8,410,931 B2 | 4/2013 | Petite et al. |
| 8,947,258 B2 | 2/2015 | Pant et al. |

(Continued)

FOREIGN PATENT DOCUMENTS

WO    2011043514    4/2011

OTHER PUBLICATIONS

Nouvel, F. et al.; Experiments of In-Vehicle Power Line Communications; Advances in Vehicular Networking Technologies; Retrieved from: http://cdn.intechopen.com/pdfs; Apr. 11, 2011.

*Primary Examiner* — Michael Neff
(74) *Attorney, Agent, or Firm* — Lorenz & Kopf, LLP (57) ABSTRACT

A power line communication based monitoring system includes an alternating current (AC) power distribution bus, a data source (such as a sensor circuit), a system modulator/demodulator (modem), and a data converter. The sensor circuit is configured to sense a mechanical state of a component and to supply a modulated sensor signal representative of the mechanical state to the AC power distribution bus. The system modem is in operable communication with the AC power distribution bus and is coupled to receive the modulated sensor signal therefrom. The system modem is configured, upon receipt of the modulated sensor signal, to demodulate the modulated sensor signal and supply a demodulated sensor signal. The data converter is coupled to receive the demodulated sensor signal from the system modem and is configured to convert the demodulated sensor signal to digital data in a standard digital data communications protocol.

18 Claims, 4 Drawing Sheets

(56) References Cited

U.S. PATENT DOCUMENTS

| | | |
|---|---|---|
| 9,100,104 B2 | 8/2015 | Nguyen et al. |
| 2006/0017324 A1 | 1/2006 | Pace et al. |
| 2006/0170285 A1 | 8/2006 | Morimitsu et al. |
| 2012/0099627 A1 | 4/2012 | Mitchell et al. |
| 2012/0123711 A1 | 5/2012 | Fausak et al. |
| 2012/0181878 A1 | 7/2012 | Nosaka et al. |
| 2012/0319826 A1 | 12/2012 | Potter |
| 2014/0143578 A1 | 5/2014 | Cenizal et al. |
| 2014/0328593 A1* | 11/2014 | Lamb .................. H04B 10/27 398/66 |
| 2015/0016271 A1 | 1/2015 | Lee |

\* cited by examiner

POWER LINE COMMUNICATION BASED MONITORING SYSTEM

TECHNICAL FIELD

The present invention generally relates to power line communication technology, and more particularly relates to power line communication based monitoring system.

BACKGROUND

Modern electronic and mechanical systems, such as aircraft or other vehicle systems, are becoming increasingly complex. Health management systems are often used to monitor various health characteristics of vehicle systems. Several factors contribute to the evolution of the health states. These factors include damage accumulation, interaction between components in the system, deviation from design characteristics, and the influence of continuous or discrete events. These aspects can be modeled and evaluated using prognostic monitors, which are configured to predict faults in the vehicle system.

In light of the above, it is becomingly increasingly desirable to monitor the status of vehicles, and more specifically the various mechanical components in a vehicle. One potentially major drawback associated with this is the increasing of numbers and lengths of wires needed to monitor more and more components. One of the proposed solutions to address this drawback is to use power line communications (PLC) technology for mechanical component data monitoring. Unfortunately, the PLC technology solutions to-date are not efficiently conducive, from a weight standpoint, to monitoring the status of multiple mechanical components.

Hence, there is a need for a PLC based vehicle monitoring system that is weight efficient for vehicles, such as aircraft. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a power line communication vehicle monitoring system includes an alternating current (AC) power distribution bus, a sensor circuit, a system modulator/demodulator (modem), and a data converter. The sensor circuit is in operable communication with the AC power distribution bus, and is configured to sense a mechanical state of a component and to supply a modulated sensor signal representative of the mechanical state to the AC power distribution bus. The system modem is in operable communication with the AC power distribution bus and is coupled to receive the modulated sensor signal therefrom. The system modem is configured, upon receipt of the modulated sensor signal, to demodulate the modulated sensor signal and supply a demodulated sensor signal. The data converter is coupled to receive the demodulated sensor signal from the system modem and is configured, upon receipt thereof, to convert the demodulated sensor signal to digital data in a standard digital data communications protocol.

In another embodiment, a power line communication vehicle monitoring system includes a main alternating current (AC) power bus, a plurality of sensor circuits, a plurality of subsystem AC power buses, a system modulator/demodulator (modem), and a data converter. Each sensor circuit is configured to sense a mechanical state of a component and to supply a modulated sensor signal representative thereof. Each subsystem AC power bus is coupled between the main AC power bus and a different one of the sensor circuits, whereby each of the modulated sensor signals is supplied to the main AC power bus. The system modem is in operable communication with the main AC power bus and is coupled to receive the modulated sensor signals therefrom. The system modem is configured, upon receipt of the modulated sensor signals, to demodulate the modulated sensor signals and supply a plurality of demodulated sensor signal. The data converter is coupled to receive the demodulated sensor signals from the system modem and is configured, upon receipt thereof, to convert the demodulated sensor signals to a standard digital data communications protocol.

In yet another embodiment, an aircraft power line communication vehicle monitoring system includes a main alternating current (AC) power bus, a plurality of line replaceable units (LRUs), a plurality of subsystem AC power buses, a system modulator/demodulator (modem), a data converter, and a digital flight data acquisition unit. Each LRU is configured to supply modulated health data representative of LRU health. Each subsystem AC power bus is coupled between the main AC power bus and a different one of the LRUs, whereby the modulated health data are supplied to the main AC power bus. The system modem is in operable communication with the main AC power bus and is coupled to receive the modulated health data therefrom. The system modem is configured, upon receipt of the modulated health data, to demodulate the modulated health data and supply demodulated health data. The data converter is coupled to receive the demodulated health data from the system modem and is configured, upon receipt thereof, to convert the demodulated health data to digital health data in an avionics data transfer compatible protocol. The digital flight data acquisition unit is coupled to receive the digital health data from the data converter Each sensor circuit is configured to sense a mechanical state of a component and to supply a modulated sensor signal representative thereof. Each subsystem AC power bus is coupled between the main AC power bus and a different one of the sensor circuits, whereby each of the modulated sensor signals is supplied to the main AC power bus. The system modem is in operable communication with the main AC power bus and is coupled to receive the modulated sensor signals therefrom. The system modem is configured, upon receipt of the modulated sensor signals, to demodulate the modulated sensor signals and supply a plurality of demodulated sensor signal. The data converter is coupled to receive the demodulated sensor signals from the system modem and is configured, upon receipt thereof, to convert the demodulated sensor signals to digital data in an avionics data transfer compatible protocol. The digital flight data acquisition unit is coupled to receive the digital data from the data converter.

Furthermore, other desirable features and characteristics of the power line communication based vehicle monitoring system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
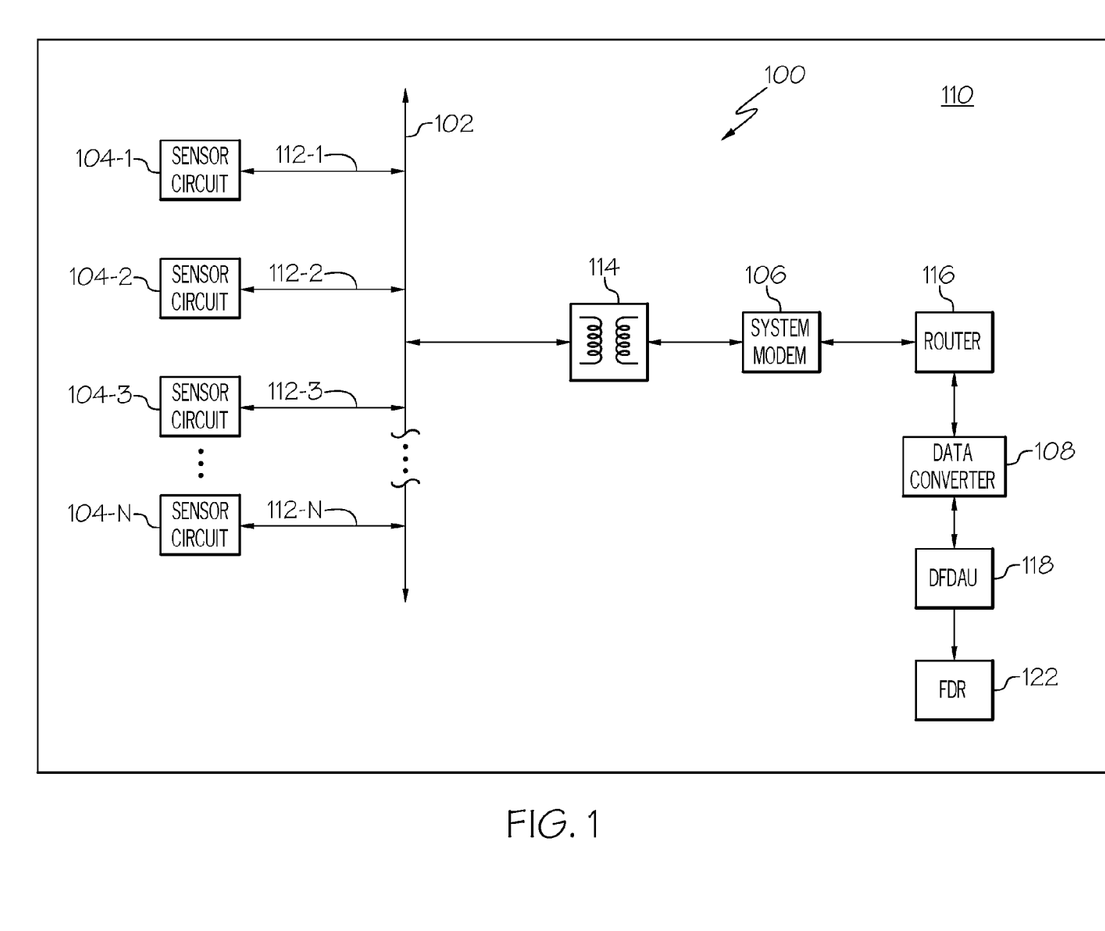
FIG. 1 is a functional block diagram of a power line communication vehicle monitoring system for a vehicle.

Referring first to FIG. 1, a power line communication vehicle monitoring system 100 is depicted, and includes an alternating current (AC) power distribution bus 102, a plurality of sensor circuits 104 (104-1, 104-2, . . . 104-N), a system modulator/demodulator (modem) 106, and a data converter 108, all disposed within a vehicle 110. It should be noted that the vehicle 110 is preferably an aircraft, but may also be any one of numerous other vehicles. For example, it may be an automobile, a watercraft, a spacecraft, or any one of numerous other terrestrial and non-terrestrial vehicles.

The AC power distribution bus 102 depicted in FIG. 1 may be variously configured and implemented. In the depicted embodiment, in which the vehicle is an aircraft, the AC power distribution bus 102 is a main AC power bus, and the system 100 additionally includes a plurality of subsystem AC power buses 112 (112-1, 112-2, . . . 112-N). Although the number of subsystem AC power buses 112 may vary, in the depicted embodiment each subsystem AC power bus 112 is coupled between the main AC power bus 102 and a different one of the sensor circuits 104.

Each sensor circuit 104 is in operable communication with the AC power distribution bus 102. In the depicted embodiment, in which the system 100 includes a plurality of sensor circuits 104 and a plurality of subsystem AC power buses 112, each sensor circuit 104 is in operable communication with the AC power distribution bus 102 via a different one of the subsystem AC power buses 112. No matter the number of sensor circuits 104, each is configured to sense a mechanical state of a component and to supply a modulated sensor signal representative of the mechanical state to the AC power distribution bus 102, via its associated subsystem AC power buses 112.

Figure 2:
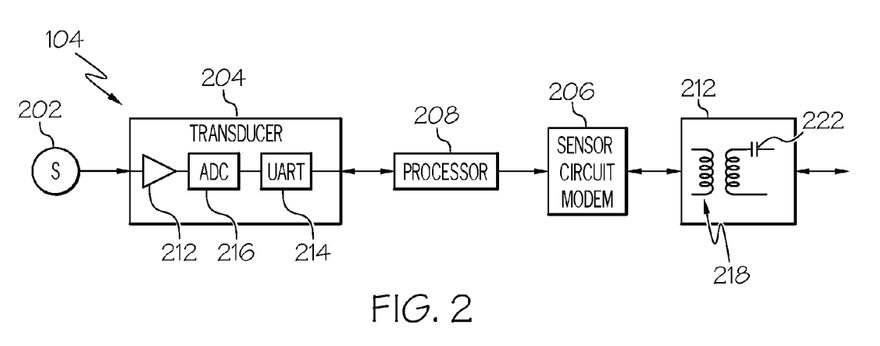
FIG. 2 depicts a functional block diagram of one embodiment of a sensor circuit that may be used to implement the system of FIG. 1.

The sensors circuits 104 may be variously configured and implemented, but in a particular embodiment, which is depicted more clearly in FIG. 2, each sensor circuit 104 includes a sensor 202, a transducer 204, a sensor circuit modem 206, and a sensor circuit processor 208. The sensor 202 is configured to sense the mechanical state of a component and supply a sensor signal representative thereof. The component may be, for example, a valve, a motor, a generator, or an actuator, just to name a few. Moreover, the sensor 202 may be variously configured and implemented. For example, the sensor 202 may be an LVDT (linear variable differential transformer), an RVDT (a rotary variable differential transformer), a micro-switch, an optical sensor, or any one of numerous other types of sensors. Regardless of the type, the sensor 202 supplies the sensor signal, which may be an analog or discrete signal, to the transducer 204.

The transducer 204 is coupled to receive the sensor signal from the sensor 202 and, as will be described momentarily, a SEND command signal from the sensor circuit processor 208. The transducer 204 is configured, upon receipt of the SEND command signal, to transmit the sensor signal to the sensor circuit modem 206. More specifically, and as FIG. 2 depicts, the transducer 204, at least in the depicted embodiment, includes an amplifier 212, a UART (universal asynchronous receiver/transmitter) 214, and an ADC (analog-to-digital converter) 216. The transducer 204 thus transmits a digitized form of the sensor signal to the sensor circuit modem 206 via the sensor circuit processor 208.

The sensor circuit processor 208, which may be implemented using a programmable logic controller (PLC), is configured to store the sensor signal until it receives an appropriate command, such as a clear-to-send command. When the command is received and confirmed, the sensor circuit processor 208 transmits the sensor signal to the sensor circuit modem 206.

The sensor circuit modem 206 is configured, upon receipt of the sensor signal, to modulate the sensor signal and thereby generate and supply a modulated sensor signal. The specific modulation technique that the sensor circuit modem 206 implements may vary, but in a particular preferred embodiment the sensor circuit modem 206 implements any one of numerous known spread spectrum modulation techniques. As is generally known, the various spread spectrum modulation techniques include frequency-hopping spread spectrum (FHSS), direct-sequence spread spectrum (DSSS), time-hopping spread spectrum (THSS), chirp spread spectrum (CSS), and various combinations of these techniques. Regardless of the specific modulation technique, the modulated sensor signal is supplied to the associated subsystem AC power buses 112 via a sensor circuit transformer 218 and, at least in the depicted embodiment, a high-voltage (HV) capacitor 222.

Before proceeding further, the above-described process that implemented by the sensor circuits 104 is depicted in flowchart form in FIG. 3, and for completeness will now be described. It should be noted that the parenthetical reference numerals in the following description refer to like reference numerals that are used in FIG. 3 to identify the flowchart blocks.

Figure 3:
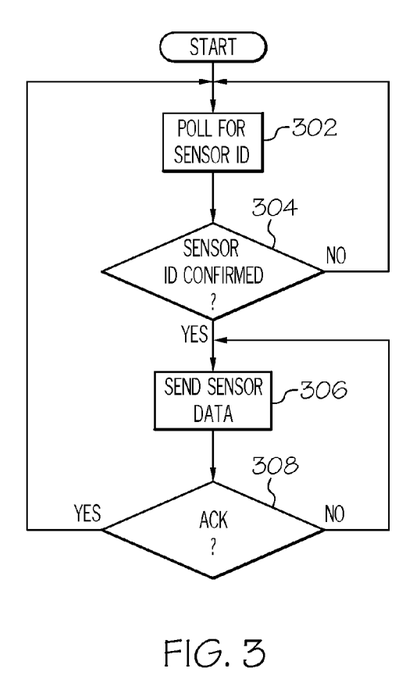
FIG. 3 depicts a process, in flowchart form, that may be implemented by the sensor circuit of FIG. 2.

As FIG. 3 depicts, the sensor circuit processor 208 continuously monitors communications for the appropriate sensor identification (ID) (302). As will be described further below, modulated sensor IDs are generated by the system modem 106. The sensor circuit modem 206 is configured to detect when the modulated sensor ID associated with its sensor 202 has been transmitted onto the main AC power bus 106 and, in response thereto, demodulates and supplies a demodulated sensor ID to the sensor circuit processor 208.

The sensor circuit processor 208 then does a check to confirm the sensor ID (304) and, upon confirmation, supplies the send command to the transducer 204 (306). The sensor circuit processor 208 may also be configured, as FIG. 3 further depicts, to await an acknowledge (ACK) signal (308) confirming that the modulated sensor signal has been received by, for example, the system modem 106.

Returning now to FIG. 1, it is seen that the system modem 106 is in operable communication with the main AC power bus 102. More specifically, it is in operable communication with the main AC power bus 102 via a transformer 114 that is coupled between the system modem 106 and the main AC power bus 102. As noted above, the system modem 106 is configured to selectively transmit, onto the main AC power bus 102, a plurality of sensor IDs. More specifically, the system modem 106 is configured to selectively generate modulated sensor IDs, each of which is associated with a different one of the sensor circuits 104, and transmit these modulated sensor IDs onto the main AC power bus 102. The system modem 106 is additionally coupled to receive, via the main AC power bus 102 and transformer 114, the modulated sensor signals supplied thereto by the sensor circuits 104. The system modem 106 is configured, upon receipt of the modulated sensor signals, to demodulate the modulated sensor signals and supply the demodulated sensor signals to the data converter 108.

Figure 4:
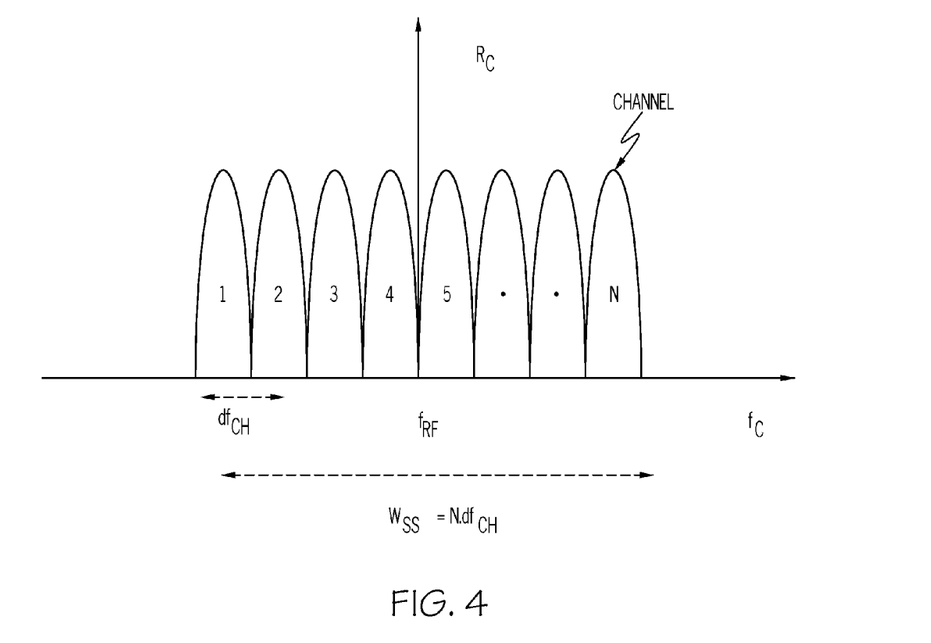
FIG. 4 graphically depicts how the system of FIG. 1 separates sensor signals into a series of channels.

Before describing the data converter 108, it is noted that in the depicted embodiment, in which the system 100 includes a plurality of sensor circuits 104, the system 100 also preferably includes a router 116. The router 116, when included, is coupled between the system modem 106 and the data converter 108, and is configured to separate each demodulated sensor signal into a different individual channel. More specifically, and as FIG. 4 depicts, the router 116 separates the bandwidth of the demodulated sensor signals into a series of channels, so that each of the different sensor circuits 104 can transmit at the same time.

Turning now to the data converter 108, this device is coupled to receive the demodulated sensor signals and is configured, upon receipt thereof, to convert the demodulated sensor signals to digital data in a standard digital data communications protocol, and more specifically a standard vehicular digital data communications protocol. Such standard vehicular digital data communications protocols may vary and may depend, for example, on the type of vehicle in which the system 100 is installed. Some non-limiting examples include various versions of the CAN protocol, which is used in numerous automobiles, and various versions of an avionics data protocol, such as the ARINC protocol, just to name a few. Regardless of the vehicular digital data communications protocol, the vehicular data bus is different than the universal data transfer protocols, thus the data convertor 108 transforms the data protocols between the vehicular digital data communications protocol and universal data protocols. In a particular preferred embodiment, data flow through the data convertor is bi-direction.

It will be appreciated that the data converter 108 may be variously configured to implement the above-described function. In particular embodiment, which is depicted more clearly in FIG. 5, the data converter 108 includes a universal data bus interface 502, a data packet module 504, a data transmit interface 506, and a data receive interface 508. The universal data bus interface 502 is configured to transmit and receive data using a universal data transfer protocol. The data the universal data bus interface 502 transmits is supplied from the data packet module 504, and the data the universal data bus interface 502 receives is supplied to the data packet module 504.

Figure 5:
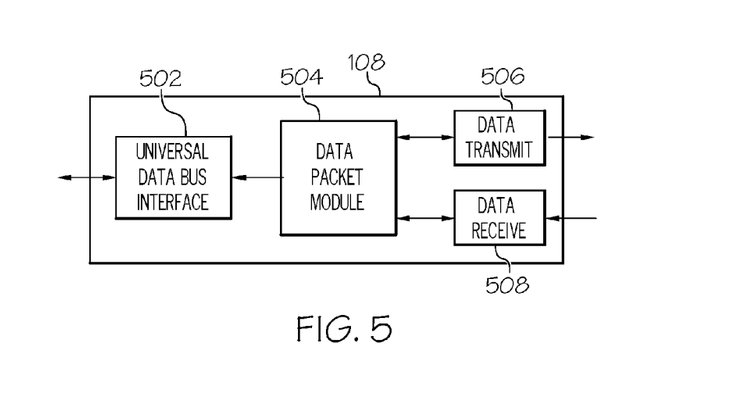
FIG. 5 depicts a functional block diagram of one embodiment of a data converter that may be used to implement the system of FIG. 1.

The data packet module 504 is configured to translate data it receives between a universal data transfer protocol and the standard vehicular digital data communications protocol. That is, when the data packet module 504 receives data in the universal data transfer protocol, it translates the data to the standard vehicular digital data communications protocol. Conversely, when the data packet module 504 receives data in the standard vehicular digital data communications protocol, it translates the data to the universal data transfer protocol.

The data that the data packet module 504 translates to the standard vehicular digital data communications protocol is supplied to the data transmit interfaces 506. The data transmit interface 506 then transmits the data to a device in the vehicle. The device may vary depending, for example, on the type of vehicle in which the system 100 is installed. In one embodiment, in which the vehicle is an aircraft, the device is a digital flight data acquisition unit (DFDAU) 118, which in turn supplies at least a portion of the data to, for example, a flight data recorder (FDR) 122 (see FIG. 1).

The data that the data packet module 504 translates from the standard vehicular digital data communications protocol to the universal data transfer protocol is supplied from the data receive interface 508. The data receive interface 508 receives the data from various devices in the vehicle. The devices may vary depending, for example, on the type of vehicle in which the system 100 is installed. In one embodiment, in which the vehicle is an aircraft, the devices include various non-illustrated health management system devices.

Figure 6:
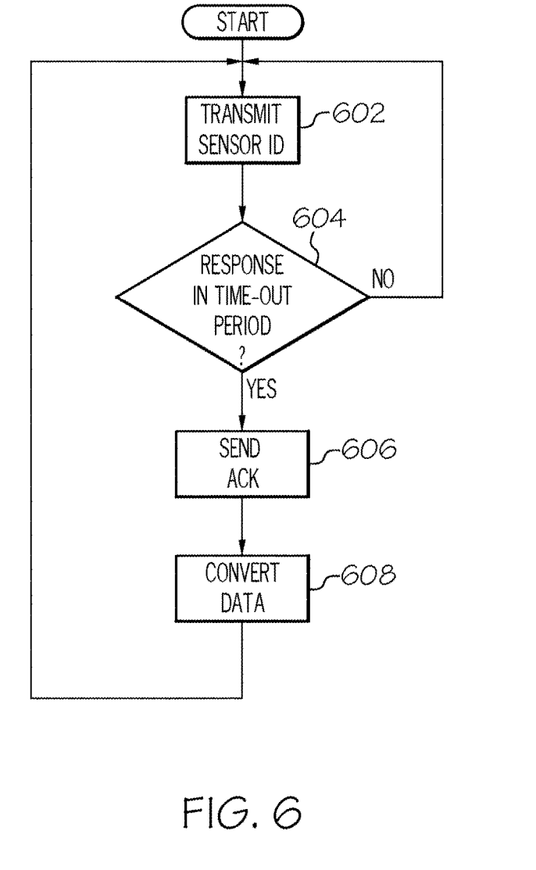
FIG. 6 depicts a process, in flowchart form, that may be implemented in the system of FIG. 1.

The system modem 106, data converter 108, and router 112 together to implement a data receiving and decoding process. One embodiment if this process is depicted in FIG. 6 and with reference thereto will now be described. It should again be noted that the parenthetical reference numerals in the following description refer to like reference numerals that are used in FIG. 6 to identify the flowchart blocks.

The system modem 106, upon initiation, generates and transmits a modulated sensor ID onto the main AC power bus 102 (602), and awaits a response from the sensor circuit 104 associated with the sensor ID (604). More specifically, the system modem 106 waits to receive the modulated sensor signal from the sensor circuit 104. If no response is received within a predetermined time-out period, then the next sensor ID is generated. If, however, the response is received, the system modem 106 transmits the above-mentioned acknowledge (ACK) signal to the sensor circuit 104 (606). The system demodulator 106 then demodulates the modulated sensor signal, and transmits the demodulated sensor signal to the data converter 108 for conversion (608). This process continues for all of the sensor circuits 104 in the system 100.

In the embodiment described above, the data supplied to the vehicle device (e.g., DFDAU) are supplied from sensor circuits 104. It will be appreciated that in other embodiments the data may additionally or instead be supplied from various other line replaceable units (LRUs) that supply data representative of system and/or component health, and transmit these data via, for example, a data bus.

The PLC based vehicle monitoring system 100 described herein is weight efficient for vehicles, such as aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A power line communication component monitoring system, comprising:
    an alternating current (AC) power distribution bus;
    a plurality of sensor circuits in operable communication with the AC power distribution bus, each sensor circuit configured to sense a mechanical state of a component and to supply a modulated sensor signal representative of the mechanical state to the AC power distribution bus;
    a system modulator/demodulator (modem) in operable communication with the AC power distribution bus and coupled to receive the modulated sensor signals therefrom, the system modem configured, upon receipt of the modulated sensor signals, to demodulate the modulated sensor signals and supply a plurality of demodulated sensor signals; and
    a data converter coupled to receive the demodulated sensor signal from the system modem and configured, upon receipt thereof, to convert the demodulated sensor signal to digital data in a standard digital data communications protocol.

2. The system of claim 1, further comprising:
a transformer coupled between the system modem and the AC power distribution bus.

3. The system of claim 1, further comprising:
a router coupled between the system modem and the data converter, the router configured to separate each demodulated sensor signal into a different individual channel.

4. The system of claim 1, wherein the AC power distribution bus is a main AC power bus, and wherein the system further comprises:
    a plurality of subsystem AC power buses, each subsystem AC power bus coupled between the main AC power bus and a different one of the sensor circuits.

5. The system of claim 4, further comprising:
    a plurality of sensor circuit transformers, each sensor circuit transformer coupled between one of the subsystem AC power buses and one of the sensor circuits.

6. The system of claim 4, wherein each sensor circuit comprises:
    a sensor configured to sense a mechanical state of a different component and supply a sensor signal representative thereof;
    a transducer coupled to receive the sensor signal and a send command signal, the transducer configured, upon receipt of the send command signal, to transmit the sensor signal;
    a sensor circuit modem configured to generate the modulated sensor signal; and
    a sensor circuit processor coupled between the transducer and the sensor circuit modem, the sensor circuit processor configured to (i) selectively supply the send command signal to the transducer and (ii) supply the sensor signal, upon transmission of the sensor signal from the transducer, to the sensor circuit modem.

7. The system of claim 6, wherein:
the system modem is further configured to selectively transmit, onto the main AC power bus, a plurality of modulated sensor identifications (IDs), each modulated sensor ID associated with a different one of the sensor circuits;
each sensor circuit modem is further configured to detect when the modulated sensor ID associated with its sensor has been transmitted onto the main AC power bus and, in response thereto, to demodulate and supply a demodulated sensor ID to the sensor circuit processor; and
the sensor circuit processor is further configured, upon receipt of the demodulated sensor ID to supply the send command signal.

8. The system of claim 1, wherein the standard digital communications protocol includes one or more of an Ethernet compatible protocol and an avionics data transfer compatible protocol.

9. A power line communication component monitoring system, comprising:
a main alternating current (AC) power bus;
a plurality of sensor circuits, each sensor circuit configured to sense a mechanical state of a component and to supply a modulated sensor signal representative thereof;
a plurality of subsystem AC power buses, each subsystem AC power bus coupled between the main AC power bus and a different one of the sensor circuits, whereby each of the modulated sensor signals is supplied to the main AC power bus;
a system modulator/demodulator (modem) in operable communication with the main AC power bus and coupled to receive the modulated sensor signals therefrom, the system modem configured, upon receipt of the modulated sensor signals, to demodulate the modulated sensor signals and supply a plurality of demodulated sensor signals; and
a data converter coupled to receive the demodulated sensor signals from the system modem and configured, upon receipt thereof, to convert the demodulated sensor signals to a standard digital data communications protocol.

10. The system of claim 9, further comprising:
a router coupled between the system modem and the data converter, the router configured to separate each of the demodulated sensor signals into a different individual channel.

11. The system of claim 9, further comprising:
a transformer coupled between the system modem and the AC power distribution bus; and
a plurality of sensor circuit transformers, each sensor circuit transformer coupled between one of the subsystem AC power buses and one of the sensor circuits.

12. The system of claim 9, wherein each sensor circuit comprises:
a sensor configured to sense a mechanical state of a different component and supply a sensor signal representative thereof;
a transducer coupled to receive the sensor signal and a send command signal, the transducer configured, upon receipt of the send command signal, to transmit the sensor signal;
a sensor circuit modem configured to generate the modulated sensor signal; and
a sensor circuit processor coupled between the transducer and the sensor circuit modem, the sensor circuit processor configured to (i) selectively supply the send command signal to the transducer and (ii) supply the sensor signal, upon transmission of the sensor signal from the transducer, to the sensor circuit modem.

13. The system of claim 12, wherein:
the system modem is further configured to selectively transmit, onto the main AC power bus, a plurality of modulated sensor identifications (IDs), each modulated sensor ID associated with a different one of the sensor circuits;
each sensor circuit modem is further configured to detect when the modulated sensor ID associated with its sensor has been transmitted onto the main AC power bus and, in response thereto, to demodulate and supply a demodulated sensor ID to the sensor circuit processor; and
the sensor circuit processor is further configured, upon receipt of the demodulated sensor ID to supply the send command signal.

14. An aircraft power line communication vehicle monitoring system, comprising:
a main alternating current (AC) power bus;
a plurality of line replaceable units (LRUs), each LRU configured to supply modulated health data representative of LRU health;
a plurality of subsystem AC power buses, each subsystem AC power bus coupled between the main AC power bus and a different one of the LRUs, whereby the modulated health data are supplied to the main AC power bus;
a system modulator/demodulator (modem) in operable communication with the main AC power bus and coupled to receive the modulated health data therefrom, the system modem configured, upon receipt of the modulated health data, to demodulate the modulated health data and supply demodulated health data;
a data converter coupled to receive the demodulated health data from the system modem and configured, upon receipt thereof, to convert the demodulated health data to digital health data in an avionics data transfer compatible protocol; and
a digital flight data acquisition unit coupled to receive the digital health data from the data converter.

15. The system of claim 14, further comprising:
a router coupled between the system modem and the data converter, the router configured to separate the demodulated health data into different individual channels.

16. The system of claim 14, further comprising:
a transformer coupled between the system modem and the AC power distribution bus; and
a plurality of LRU transformers, each LRU transformer coupled between one of the subsystem AC power buses and one of the LRUs.

17. The system of claim 14, further comprising:
a plurality of sensor circuits, each sensor circuit configured to sense a mechanical state of a component and to supply a modulated sensor signal representative thereof,
wherein each sensor circuit comprises:
a sensor configured to sense a mechanical state of a different component and supply a sensor signal representative thereof;
a transducer coupled to receive the sensor signal and a send command signal, the transducer configured, upon receipt of the send command signal, to transmit the sensor signal;

a sensor circuit modem configured to generate a modulated sensor signal; and a sensor circuit processor coupled between the transducer and the sensor circuit modem, the sensor circuit processor configured to (i) selectively supply the send command signal to the transducer and (ii) supply the sensor signal, upon transmission of the sensor signal from the transducer, to the sensor circuit modem.

18. The system of claim 17, wherein:

the system modem is further configured to selectively transmit, onto the main AC power bus, a plurality of modulated sensor identifications (IDs), each modulated sensor ID associated with a different one of the sensor circuits;

each sensor circuit modem is further configured to detect when the modulated sensor ID associated with its sensor has been transmitted onto the main AC power bus and, in response thereto, to demodulate and supply a demodulated sensor ID to the sensor circuit processor; and the sensor circuit processor is further configured, upon receipt of the demodulated sensor ID to supply the send command signal.

* * * * *